US006261986B1

(12) United States Patent
Bowman et al.

(10) Patent No.: US 6,261,986 B1
(45) Date of Patent: Jul. 17, 2001

(54) PRODUCTION AND ARTICLE OF IRON/SURFACTANT-MODIFIED ZEOLITE PELLETS TO RETAIN AND DESTROY WATER POLLUTANTS

(75) Inventors: Robert S. Bowman, Lemitar, NM (US); Richard L. Helferich, Clayton, OH (US)

(73) Assignees: New Mexico Tech Research Foundation; Cercona of America, Inc.

( * ) Notice: Subject to any disclaimer, the term of this patent is extended or adjusted under 35 U.S.C. 154(b) by 0 days.

(21) Appl. No.: 09/064,691

(22) Filed: Apr. 22, 1998

(51) Int. Cl.⁷ ............................................... B01J 29/04
(52) U.S. Cl. .............................. 502/62; 502/60; 502/64; 502/66; 502/74
(58) Field of Search ................................. 502/60, 62, 64, 502/66, 74

(56) References Cited

U.S. PATENT DOCUMENTS

| | | | |
|---|---|---|---|
| 2,004,257 | 6/1935 | Tschirner . | |
| 4,528,276 | * 7/1985 | Cambell et al. | 502/62 |
| 4,554,262 | * 11/1985 | Dessau | 502/62 |
| 4,916,095 | * 4/1990 | Fogler et al. | 502/62 |
| 5,278,112 | * 1/1994 | Klatte | 502/62 |
| 5,314,852 | * 5/1994 | Klatte | 502/60 |
| 5,320,773 | 6/1994 | Perman et al. . | |
| 5,362,696 | * 11/1994 | Takahashi et al. | 502/64 |
| 5,576,257 | * 11/1996 | Jordan | 502/62 |
| 5,612,270 | * 3/1997 | Beck et al. | 502/64 |
| 5,622,630 | 4/1997 | Romano . | |
| 5,747,403 | * 5/1998 | Boyd et al. | 502/62 |
| 5,759,938 | * 6/1998 | Cody et al. | 502/62 |

OTHER PUBLICATIONS

Stephen A. Boyd; Attenuating organic . . . soil modification; 1988; pp. 345–347.
Robert W. Gillham et al; Enhanced Degradation . . . Zero–Valent Iron; 1994; pp 958–967.
David W. Blowes et al; In–Situ Remediation . . . Laboratory Studies; 1997; pp. 3348–3357.
Robert S. Bowman et al; Sorption of Nonpolar . . . Surfactant–Modified Zeolites; 1995.
Robert S. Bowman et al; Mechanisms of Contaminant . . . Surfactant–Modified Zeolite; 1997; pp. 104–108.

* cited by examiner

*Primary Examiner*—Tom Dunn
(74) *Attorney, Agent, or Firm*—Robert W. Becker & Associates (57) ABSTRACT

A method of producing a pollutant adsorption and degradation article, and such article, are provided. At least one adsorbent is mixed with at least one pollutant transforming agent to form a mixture. This mixture is compacted to form a porous, highly permeable article. If necessary, the article can be modified with surfactant either after the compacting step or by adding the surfactant to the mixture prior to the compacting step. In addition, if necessary, a binding agent can be added to the mixture prior to the compacting step.

20 Claims, 7 Drawing Sheets

PRODUCTION AND ARTICLE OF IRON/SURFACTANT-MODIFIED ZEOLITE PELLETS TO RETAIN AND DESTROY WATER POLLUTANTS

BACKGROUND OF THE INVENTION

The present invention relates to a method of producing an article, and to the article itself, for example in pellet shape, which can simultaneously retain and destroy several classes of water pollutants.

Chlorinated compounds and inorganic oxyanions such as chromate and arsenate are major water pollutants at industrial sites, DOE facilities, and military installations. Once introduced into water, these toxic compounds tend to be only slowly degraded/transformed by natural processes. Improved methods and products are needed to trap and destroy these pollutants. Among these products are chemical filters.

Current chemical filters can be classified as either degradation filters or adsorption/precipitation filters. In degradation filters, the pollutant is converted to an innocuous form as water passes through. In adsorption/precipitation filters, pollutants are immobilized within the filter until the retention capacity is exceeded. Each of these filter types has certain disadvantages. Degradation filters require a minimum residence time to allow complete pollutant destruction. In systems with rapid water flow and/or recalcitrant pollutants, prohibitively thick filters may be required to provide the needed residence time. Adsorption/precipitation filters have a limited capacity for pollutant retention; once this capacity is exceeded, the filter needs to be regenerated or replaced. Clearly, a filter material which combines the properties of pollutant adsorption (to increase residence time) and pollutant destruction or transformation (to obviate the need for regeneration/replacement) would be very desirable.

It is therefore an object of the present invention to provide a filter material that combines the properties of water pollutant adsorption and destruction, thus overcoming the drawbacks of heretofore known filter materials used for removing pollutants from water. This new material should result in a less expensive and more efficient treatment of water polluted with chlorinated hydrocarbons and/or inorganic oxyanions.

This object, and other objects and advantages of the present invention, will appear more clearly from the following specification and examples.

SUMMARY OF THE INVENTION

The object of the present invention is realized by a method of intimate mixing and binding of materials to create a combined pollutant adsorption/degradation filter material and includes the steps of: providing at least one adsorbent (for example, natural zeolite or clay), providing at least one pollutant destruction or transformation material (for example, iron or other reactive metal), possibly providing a binder (for example, an aluminosilicate binder), mixing the components together to form a mixture, and processing the mixture to form porous, highly permeable pellets, blocks, or other shaped forms to produce a durable filter product which is stable in water. The adsorbent is modified with surfactant prior to or after the processing. Other components may be added or the processing modified to vary the density, porosity, or permeability of the filter product or to improve the adsorption and pollutant destruction properties of the product.

The most common adsorbents for polluted water treatment are granular activated carbon and synthetic ion exchange resins. Both of these adsorbents are relatively expensive. Inexpensive surfactant-modified clay minerals have been shown excellent for removal of nonpolar organics from water (Boyd et al. 1988), but their low hydraulic conductivities and their tendency to shrink or swell limit their use in filters. Surfactant-modified zeolite (SMZ), in contrast to surfactant-modified clay minerals, has excellent hydraulic properties. In addition to effectively adsorbing nonpolar organic contaminants, SMZ has great affinity for inorganic oxyanions such as chromate, arsenate, sulfate, selenate (Bowman etal., 1995) and heavy metal cations such as lead (Bowman et al., 1997). Thus SMZ can be used to remove multiple contaminants simultaneously and its economical cost makes it attractive for adsorption filters. Many different surfactants may be used, including hexadecyltrimethylammonium, octadecyltrlmethylammonium, and 4-methylpyridinium.

The most commonly used destruction filter is zero-valent iron (Fe) for treatment of water contaminated with chlorinated organic compounds or inorganic compounds in higher oxidation states (Gillham and O'Hannesin, 1994; Blowes et al. 1998). The advantage of iron and other metal filters is the complete destruction of chlorinated organic compounds and immobilization of oxidized inorganic compounds. Iron and some other metals or metal combinations chemically reduce chlorinated hydrocarbons to innocuous organic compounds and chloride. These same metals also reduce oxidized inorganic compounds, which generally have high water solubilities and are mobile in subsurface environments, to less soluble and less mobile forms. The major drawback of metal filters is the residence time required for complete pollutant destruction/immobilization. Depending upon reaction kinetics, very long or very large filters may be necessary.

The advantage of using SMZ as a filter is its low cost as well as the instantaneous adsorption of multiple types of contaminants. However, the SMZ filter will cease to function when the amounts of pollutants adsorbed exceed the filter adsorption capacity. We have found that a combination of the particular assets of Fe and SMZ allows optimization of filter performance. Adsorption of pollutants in a combined Fe/SMZ filter increases pollutant residence time and reduces the required filter length, lowering costs of filter materials and operation.

A number of advantages are realized in the preparation of the surfactant modified iron/zeolite using the present technique, including the selection of raw materials in terms of size, shape and composition, as well as in the ease of manufacturing. It is well known that available surface area is the key to the reactivity of adsorptive materials. Following this logic, the selection of finely ground raw materials is superior to larger sizes. However, finer or smaller aggregates result in reduced hydraulic conductivity or permeability of the product. To overcome this limitation, the finely ground material can be agglomerated or pelletized. In this fashion, not only can the permeability of the product be greatly improved, but so can the strength of the individual pellets. Strength is important for increased resistance to mechanical abrasion of the material in service.

While the pelletization of iron and zeolite materials can be accomplished by a number of conventional techniques, a major concern is the reduction in the overall reactivity or adsorptive ability of the agglomerated pellets due to the particular techniques and/or binder system used to form the pellets. In order to fully utilize the benefits afforded by the combination of ingredients in the proposed invention (surfactant, iron and zeolite) the diffusion characteristics of the contaminants in question should not be limited or unduly interfered with. Consequently, an ideal binder system, if needed, would be one in which a pellet with maximum adsorption capacity is achieved with maximum macroporosity for minimum diffusion resistance to the critical ingredients while at the same time providing sufficient strength to withstand the normal handling and abrasion associated with its use in service. If the binder used in the pelletizing process seals the surface of the pellet thereby preventing access to the surrounding contaminated environment, the effectiveness of the adsorption properties is also severely limited. In addition, if the binder used acts as an inert filler to bond the reactive/adsorption materials together, then the overall useable content is also reduced. For example, if 20% by volume of an inert binder phase is required to bond the reactive/adsorption material, then the overall availability of the reactive/adsorptive material is reduced by this same 20%. In the present technique, all of these shortcomings are overcome by using an inorganic binder system that is itself an adsorptive material capable of adding to the overall effectiveness of the pelletized agglomerate.

In addition to using natural zeolite or clay as the adsorbent, synthetic zeolite, metal oxides, and other ion exchange materials, or mixtures therof, could be used. In addition, the pollutant transforming agent could be iron, iron alloys, other metallic or bimetallic compounds, other chemical reducing agents, and mixtures thereof. The bimetallic compounds include iron/high silicon iron, iron/copper, iron/nickel, iron/palladium, iron/platinum, iron/zinc, and iron/silver. The valance state of the iron could vary. The surfactant is a cationic surfactant, and can be, for example, hexadecyltrimethylammonium, octadecyltrimethylammonium, methyl-4-phenylpyridium, phenyltrimethylammonium, benzyltrimethylammonium, and other cationic surfactants having a molecular weight greater than 125. Activated carbon or charcoal could also be added to the mixture prior to the step of compacting the substituents.

One of the preferred methods used in the present invention utilizes a sodium aluminosilicate hydrogel binder system to achieve a highly porous binder phase capable of contributing to the adsorptive capacity of the final pellet. The amorphous sodium aluminosilicate hydrogel has ion exchange characteristics similar to the zeolite portion of the pellets. This hydrogel is formed by the controlled blending of soluble silicate and aluminate materials that when mixed in the proper portions will gel in a controlled, reproducible amount of time, binding any ingredients added to these solutions prior to mixing. A foaming agent, such as aluminum metal powder, could also be added to the binder portion to increase permeability and hydraulic conductivity of the filter article. In particular, if a sodium aluminosilicate hydrogel binder system is utilized, the aluminum metal powder can be added prior to gelation, resulting in the evolution of hydrogen gas that causes the pellets to foam prior to setting of the material.

Figure 1:
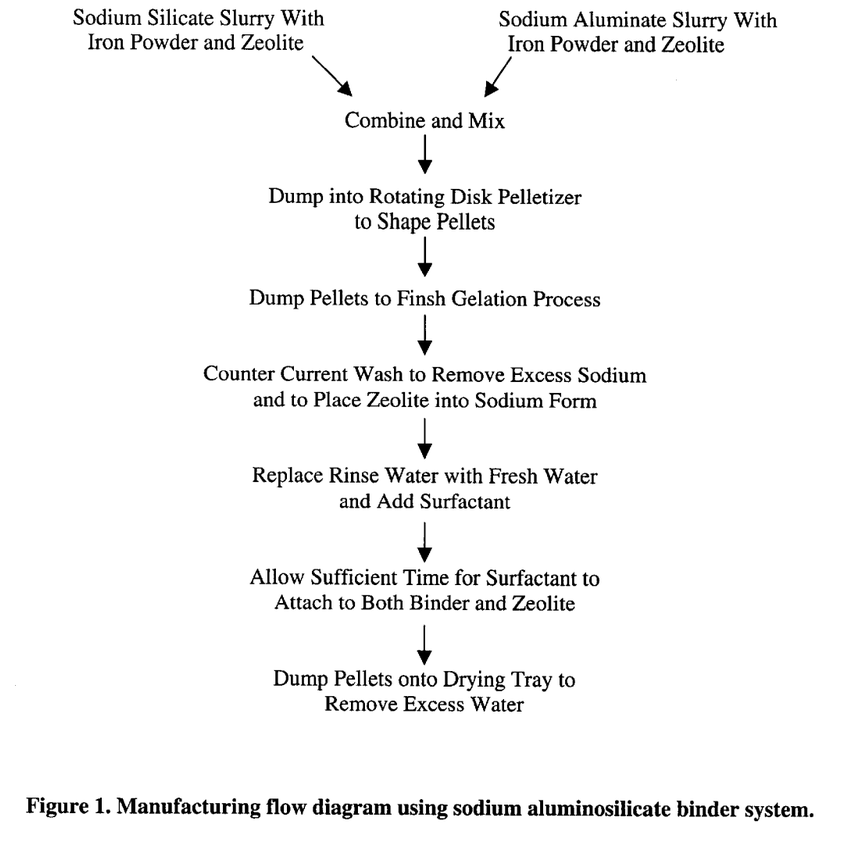
Figure 1. Manufacturing flow diagram using sodium aluminosilicate binder system.

The flow diagram in FIG. 1 illustrates a typical manufacturing technique that was followed in making an initial lot of pellets for investigation. The first step consists of blending all the necessary dry ingredients together prior to adding the liquids. The dry ingredients are then metered into the inlet port of a high intensity, continuous mixer where they are further mixed with the two, metered liquid binder solutions, sodium silicate and sodium aluminate. The wetted mass is continuously mixed and blended prior to discharge into the rotary disk pelletizer. Once in the rotating disk, the wetted mass becomes packed into spherically shaped pellets as they continuously roll around in the disk. As in any disk pelletizing operation, the disk configuration (height and angle, speed, and liquid binder content) all interact at this point to control the size and shape of the pellets being formed. Higher speeds and binder levels typically produce larger pellets. The sodium aluminosilicate binder is unique at this point over other binders typically used in disk pelletizing. In this particular system, the liquid binder will change from a wet, sticky, low viscosity system, to a dry, relatively hard gelled pellet having the proper composition within minutes of entering the rotating disk pelletizer.

Another feature unique to this particular binder system is that a foaming agent can be included which will cause the pellet to foam to approximately two to three times it's original volume prior to gelation. In this fashion, both the hydraulic conductivity (permeability) of the pellets and their specific surface area is greatly improved for greater exposure in service.

Once the pellets are formed to the proper size, they are continuously discharged from the disk pelletizer onto either a conveyor or series of drying trays where they are further cured to develop sufficient strength for further handling. Once cured (in generally a few minutes to less than an hour at ambient temperature), they are rinsed in a countercurrent water system whereby the excess sodium from the starting silicate and aluminate solutions goes into solution.

At this point it is now possible to exchange sodium, potassium, calcium, and other inorganic cations on the zeolite with a cationic surfactant (forexample, hexadecyltrimethylammonium) by changing the rinse water to a solution containing a controlled amount of the desired surfactant. The amount of surfactant added depends upon the specific properties and amounts of the zeolite and the binder, but will generally be in the range of several hundred millimoles of surfactant per kilogram of zeolite included in the formulation.

Figure 2:
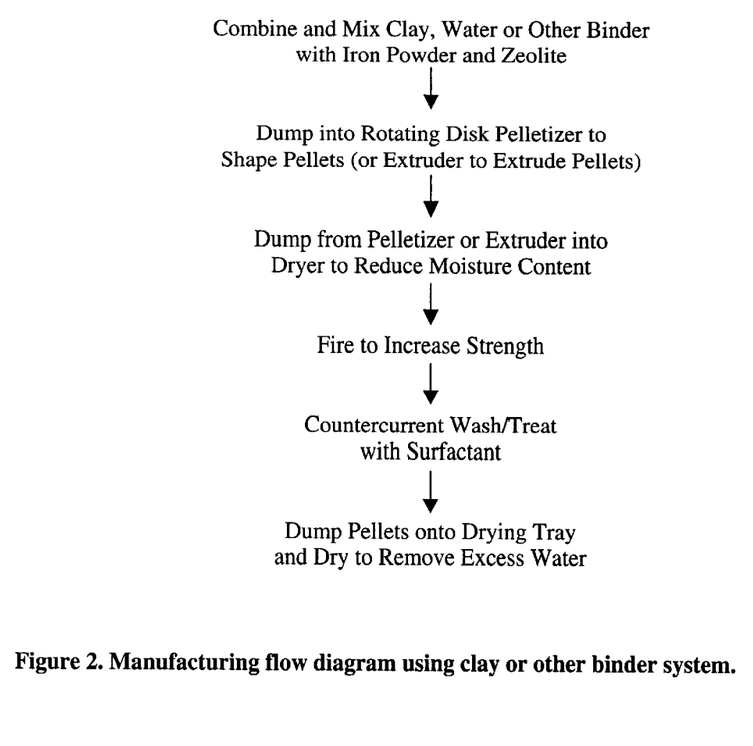
Figure 2. Manufacturing flow diagram using clay or other binder system.

Another preferred pelletizing method is to use clay or other binding material followed by firing to increase the pellet strength. This second process in illustrated in the flow diagram FIG. 2.

We have tested the overall oxyanion and chlorinated hydrocarbon removal efficiency of pelletized Fe/SMZ due to the combined mechanisms of adsorption and destruction, using chromate and perchloroethylene (PCE) as example compounds. The results suggest a synergistic effect for pollutant destruction using pelletized Fe/SMZ.

The following examples demonstrate the effectiveness of Fe/SMZ pellets as a combined adsorption/destruction medium.

EXAMPLE 1

1. 1500 grams of powdered iron (screened to less than 50 mesh) was dry blended with 400 grams of clinoptilolite powder (screened to less than 50 mesh).
2. The dry blended powder was placed in a suitable mixing chamber (in this case a 5 quart Hobart paddle mixer) to which 167 g of diluted sodium disilicate solution (13% $Na_2O$, 26% $SiO_2$, balance water) and 178 grams of diluted sodium meta-aluminate (17.5% $Na_2O$, 22% $Al_2O_3$, balance water) was added and then intensely mixed until a uniformly wetted mass was obtained.
   Note: Combining sodium silicate and sodium aluminate in this fashion will form a binding gel surrounding and bonding the incorporated powders via the resultant sodium aluminosilicate hydrogel per the following reaction mechanism:

$$Na_2O:2SiO_2 + Na_2O:Al_2O_3 + (x+1)H_2O \rightarrow Na_2O:Al_2O_3:2SiO_2:xH_2O + 2\ NaOH$$

3. The wetted mass from the mixer was then immediately placed in a rotating disk pelletizer that quickly rolled the blended materials into small beads to pea sized pellets within a few minutes.
4. Once the pellets were formed in this manner they were dumped on a drying tray to allow the gelation process to be completed. Once gelled, the pellets remained on the tray until dried and sufficient handling strength was obtained. This process typically required an hour or more and was controlled by the ambient temperature and humidity conditions.
5. The next step in the process was to remove the excess sodium hydroxide as shown in the equation in step 2 by rinsing the dried pellets in a recirculating water bath. The dried pellets were placed in a bucket or suitable container having a perforated bottom into which a recirculating flow or fresh water moved through the container essentially removing the excess sodium hydroxide. At the same time, some of the excess sodium was ionically exchanged with the calcium, magnesium and potassium ions associated with the starting clinoptilolite zeolite material.
6. By measuring the amount of sodium ion in the recirculating water used in step 5, the time required to remove the excess sodium was determined when the rate of sodium increase in the recirculating water approached zero.
7. At this time, the recirculating water was replaced with fresh water to which the cationic surfactant was added. The surfactant replaced some of the inorganic cations (e.g., sodium, calcium, potassium) in the pellets.
8. The surfactant modified iron/zeolite pellets were now rinsed a third time, drained and allowed to dry prior to implementation in the field.

EXAMPLE 2

Figure 3:
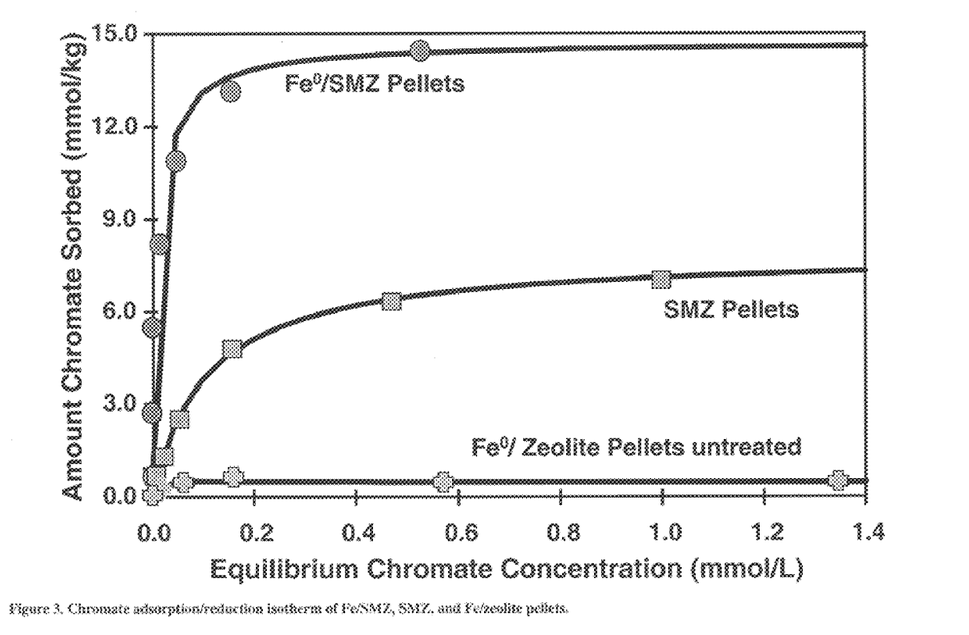
Figure 3. Chromate adsorption/reduction isotherm of Fe/SMZ, SMZ, and Fe/zeolite pellets.

We constructed chromate adsorption/reduction isotherms based on a 24 hour equilibration period in order to compare the efficiency of Fe/SMZ pellets, SMZ, and Fe/zeolite pellets. The pellets were manufactured by the process described above. The Fe/zeolite pellets contained 67% iron, 26% zeolite, and 7% aluminosilcate binder by weight. The Fe/SMZ pellets had the same composition but 2% by weight of the surfactant hexadecyltrimethylammonium bromide (HDTMA-Br) by weight was added in the form of an aqueous solution after the pellets were prepared. The Fe/SMZ pellets were air dried before use. The SMZ pellets contained 88% zeolite, 7% aluminosilicate binder, and 5% HDTMA-Br by weight. The HDTMA-Br was added in the form of an aqueous solution after the pellets were prepared. The SMZ pellets were air dried before use. Both the adsorption intensity and the adsorption capacity (as defined by the initial slope and the plateau of the adsorption isotherm) of Fe/SMZ are significantly higher than those of SMZ and Fe/zeolite (FIG. 3). Fe/zeolite pellets without surfactant modification show limited chromate removal, due mainly to chromate reduction by the Fe (FIG. 3). Thus the Fe/SMZ pellets are superior for removing the pollutant chromate from water.

EXAMPLE 3

We determined the rate of chromate removal from aqueous solution by Fe/SMZ pellets, SMZ, and Fe/zeolite pellets. The pellets were described as directed in Example 2. The results are presented in FIG. 4. The aqueous chromate concentration was reduced to 1/10 of the initial concentration after a 30 minute equilibration time with the Fe/SMZ pellets. Beyond 30 minutes, chemical reduction controls the further removal of chromate from solution. For the Fe/SMZ pellet samples, the aqueous chromate concentration reached zero at 8 hours, while for SMZ pellets the equilibrium chromate concentration remained the same from 15 minutes to 16 hours, indicating equilibrium adsorption (FIG. 4).

Figure 4:
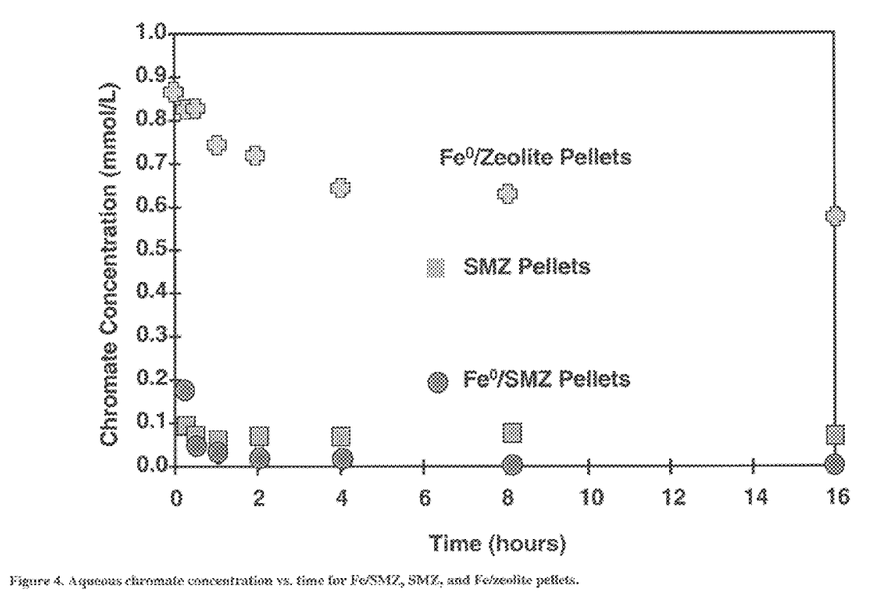
Figure 4. Aqueous chromate concentration vs. time for Fe/SMZ, SMZ, and Fe/zeolite pellets.
Figure 5:
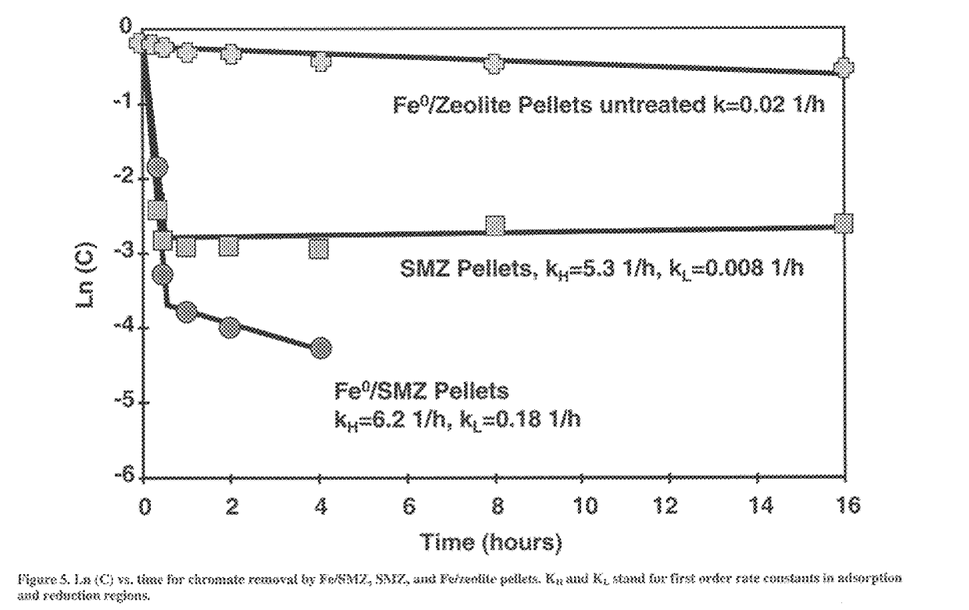
Figure 5. Ln (C) vs. time for chromate removal by Fe/SMZ, SMZ, and Fe/zeolite pellets. $K_H$ and $K_L$ stand for first order rate constants in adsorption and reduction regions.

Replotting the results of FIG. 4 on a different scale illustrates the effectiveness of Fe/SMZ pellets even more clearly. A plot of ln(C) vs. time is presented in FIG. 5. Without surfactant modification, the removal of chromate from aqueous solution by Fe/zeolite pellets was completely controlled by reduction, as manifested by a pseudo-first order reaction with a rate constant of 0.02 hour$^{-1}$. For the Fe/SMZ pellets, the data can be divided into two regions with pseudo-first order reactions in each region. Comparing the rate constants of Fe/SMZ to those of SMZ, it can be seen that the higher early rate constants are due to chromate adsorption by SMZ, while the later lower rate constants are due to chromate reduction by Fe. The rate constant in the later region for the Fe/SMZ pellets (0.18 hour$^{-1}$) is significantly greater than those of the samples without iron or without SMZ, indicating synergistic effects of chromate adsorption/reduction by Fe/SMZ pellets. The overall removal of chromate from aqueous solution by Fe/SMZ pellets is at least one order of magnitude faster than that of the other two samples. It is apparent that there is a significant synergistic effect with Fe/SMZ for chromate adsorption followed by reduction.

EXAMPLE 4

Figure 6:
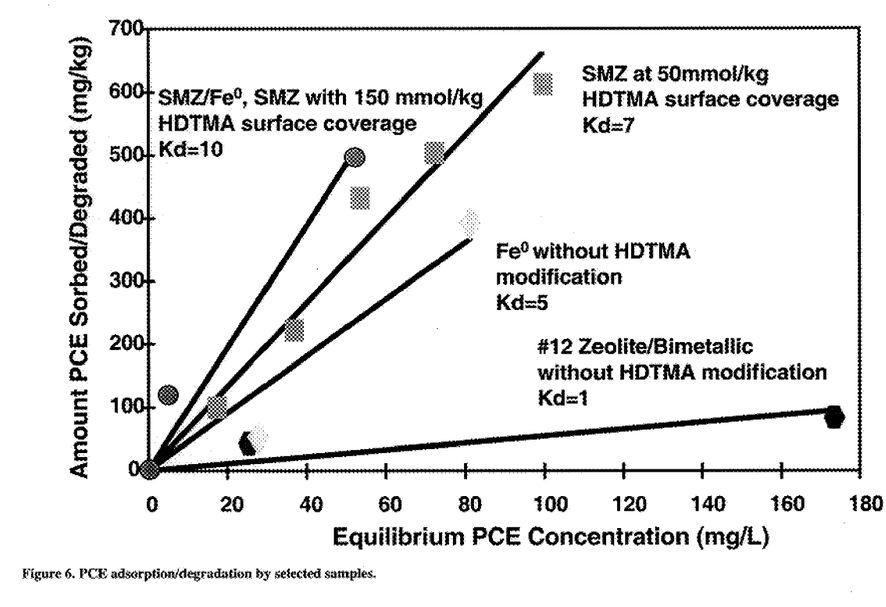
Figure 6. PCE adsorption/degradation by selected samples.

Perchloroethylene adsorption/degradation by a mixture of equal weights of iron and zeolite which had been treated with 150 mmol/kg of HDTMA (Fe/SMZ), zeolite treated with 50 mmol/kg of HDTMA (SMZ), pure Fe, and pellets composed of equal weights of bimetallic-Fe and zeolite (without surfactant treatment) plus 7% by weight of aluminosilicate binder is presented in FIG. 6. The Fe/SMZ produced the highest equilibrium adsorption/degradation coefficient ($K_d$). The removal of PCE by Fe/SMZ could be attributed to adsorption by SMZ, degradation by Fe, or the combined action of these two components. The removal of PCE by pure Fe was due to reductive dechlorination only. Bimetallic-Fe/zeolite pellets gave the lowest PCE adsorption/degradation, possibly due to the oxidation of Fe in the bimetallic form. One of the PCE degradation products, TCE, was observed and measured by gas chromatography in the samples containing Fe. The TCE/PCE ratio was highest in SMZ/Fe mixture (6–9%) compared to 0.5–1% for samples without surfactant modification. Control samples without Fe showed no production of TCE. Thus, dechlorination of PCE by Fe is enhanced in the presence of SMZ.

EXAMPLE 5

Figure 7:
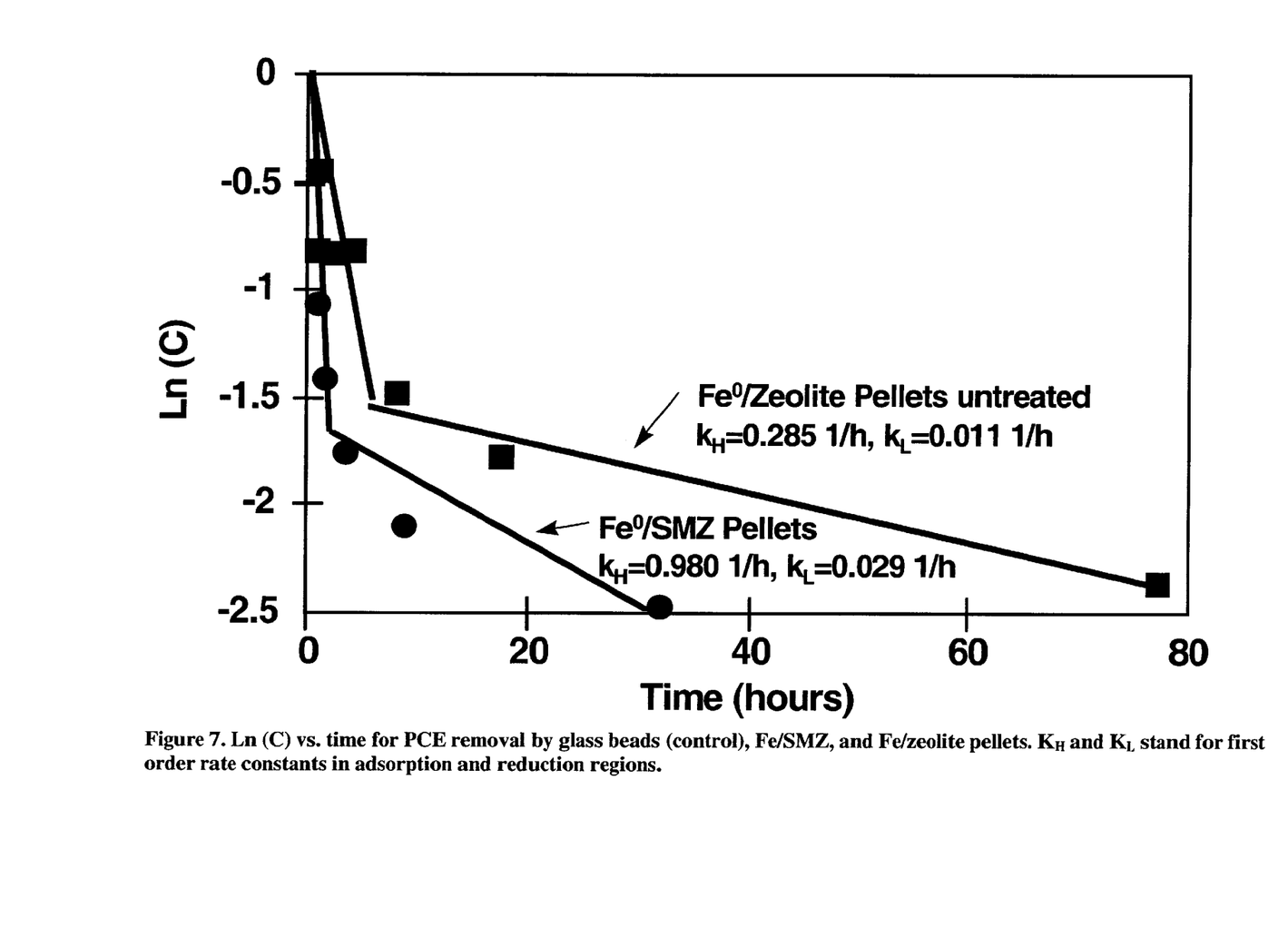
Figure 7. Ln (C) vs. time for PCE removal by glass beads (control), Fe/SMZ, and Fe/zeolite pellets. $K_H$ and $K_L$ stand for first order rate constants in adsorption and reduction regions.

We determined the rate of PCE removal from aqueous solution by Fe/SMZ pellets and Fe/zeolite pellets. The results in terms of the natural log of the PCE concentrations [ln(C)] vs. time is presented in FIG. 7. As with the data for chromate adsorption/reduction shown in FIG. 5, the data of FIG. 7 can be divided into two regions with pseudo first-order reactions in each region. Adsorption of PCE by the Fe/SMZ pellets reduces the PCE concentration in solution by almost two orders of magnitude within a few hours, at a rate of 0.980 hour$^{-1}$. Sorption by Fe/zeolite pellets is much slower (0.285 hour$^{-1}$) and not as extensive. Following the initial sorption, chemical reduction of PCE occurs at a rate of 0.029 hour$^{-1}$ with the Fe/SMZ pellets, almost three times as fast as the case for the Fe/zeolite pellets without surfactant (0.011 hour$^{-1}$). It is again apparent that there is a significant synergistic effect with Fe/SMZ for PCE adsorption followed by reduction.

From the above examples, it can be concluded that not only is it feasible and practical to use pelletized SMZ/Fe to promote PCE adsorption and degradation as well as to enhance the removal of chromate from aqueous solution, but the results are unexpectedly high. From an application point of view, we expect to be able to use a smaller amount of SMZ/Fe pellets to achieve a given level of contaminant removal compared to using Fe or SMZ (or other adsorbent) alone in a chemical filter.

The identities and proportions of adsorbent, pollutant transforming agent, surfactant and binder may be varied to provide the optimum combination of properties for a particular application. As previously indicated, the adsorbent may be selected from a group including natural zeolite, synthetic zeolite, clay, metal oxides, and other ion exchange materials. The pollutant transforming agent may be selected from the group including iron, iron alloys, other metallic and bimetallic compounds, and other chemical reducing agents. The binder may be selected from a group including sodium aluminosilicate hydrogel binder system, calcium aluminate, calcium silicate, and portland cement. The surfactant may be selected from a group including hexadecyltrimethylammonium, octadecyltrimethylammonium, methyl-4-phenylpyridium, phenyltrimethylammonium, benzyltrimethylammonium, and other cationic surfactants having molecular weights greater than 125. If the adsorbent retains the pollutants without the addition of surfactant then the surfactant may be omitted from the mixture. In general, the adsorbent will represent from 10% to 80% by weight of the article, the pollutant transforming agent will represent from 10% to 80% of the article, the binder will represent from 0% to 20% of the article, and the surfactant will represent 0% to 10% of the article.

For the examples presented above, the optimum ratios are from 15% to 45% by weight of zeolite, 50% to 80% by weight of iron, 5% to 20% by weight of aluminosilicate binder, and 1% to 5% by weight of the surfactant HDTMA.

The present invention is, of course, in no way restricted to the specific disclosure of the specifications, drawings, and examples but also encompasses any modifications within the scope of the appended claims.

What we claim is:

1. A method of producing a pollutant adsorption, and degradation article, including the steps of:
   forming a mixture of dry solids of at least one adsorbent including a zeolite absorbent and at least one pollutant transforming agent comprising iron;
   compacting said mixture to form a porous, permeable article; and,
   modifying said article with surfactant after said compacting step or adding said surfactant to said mixture prior to said compacting step, wherein the substituents of said mixture are not dissolved but maintain their chemical composition.

2. A method according to claim 1, wherein said adsorbent optionally contains an additional adsorbent component selected form the group consisting of clay, metal oxides, and other ion exchange materials.

3. A method according to claim 2, wherein said at least one pollutant transforming agent optionally contains an additional pollutant transforming agent selected form the group consisting of other metallic and bimetallic compounds, and other chemical reducing agents.

4. A method according to claim 3, wherein said bimetallic compounds include iron/copper, iron/nickel, iron/palladium, iron/high silicon iron, iron/platinum, iron/zinc, and iron/silver.

5. A method according to claim 3, wherein a chemical form of said iron varies.

6. A method according to claim 3, which includes the further step of adding a binder portion to said mixture prior to said compacting step.

7. A method according to claim 6, wherein said binder portion is selected from the group consisting of a sodium aluminosilicate hydrogel binder system, calcium aluminate, calcium silicate, and portland cement.

8. A method according to claim 7, wherein a foaming agent is added to said binder portion to increase permeability and hydraulic conductivity of said article.

9. A method according to claim 8, wherein said foaming agent is aluminum metal powder.

10. A method according to claim 7, which includes the step of firing said article prior to said step of modifying with surfactant.

11. A method according to claim 3, wherein said surfactant is a cationic surfactant.

12. A method according to claim 11, wherein said surfactant is selected from the group consisting of hexadecyltrimethylammonium, octadecyltrimethylammonium, methyl-4-phenylpyridium, phenyltrimethylammonium, benzyltrimethylammonium, and other cationic surfactants having a molecular weight greater than 125.

13. A method according to claim 11, which includes the step of adding activated carbon or charcoal to said mixture prior to said compacting step.

14. A pollutant adsorption and degradation article comprising a mixture of dry solids of at least one adsorbent including a zeolite absorbent, and at least one pollutant transforming agent comprising iron in a compacted, porous, permeable form, and a surfactant to modify said adsorbent, wherein the substituents of said mixture are not dissolved but maintain their chemical composition.

15. An article according to claim 14, wherein said adsorbent optionally contains an additional adsorbent component selected form the group consisting of clay, metal oxides, and other ion exchange materials and said at least one transforming agent optionally contains an additional pollutant transforming agent selected form the group consisting of other metallic and bimetallic compounds, and other chemical reducing agents.

16. An article according to claim 15, wherein said surfactant is cationic surfactant selected from the group consisting of hexadecyltrimethylammonium, octadecyltrimethylammonium, methyl-4-phenylpyridium, phenyltrimethylammonium, benzyltrimethylammonium, and other cationic surfactants having a molecular weight greater than 125.

17. An article according to claim 16, wherein said mixture includes a binder portion selected from the group consisting of a sodium aluminosilicate hydrogel binder system, calcium aluminate, calcium silicate, and portland cement.

18. An article according to claim 17, wherein said mixture further includes a foaming agent.

19. An article according to claim 18, wherein said foaming agent is aluminum metal powder.

20. An article according to claim 17, wherein said mixture further includes activated carbon or charcoal.

* * * * *